(12) United States Patent
Nakamura (10) Patent No.: US 8,565,155 B2
(45) Date of Patent: Oct. 22, 2013

(54) MOBILE TERMINAL, BASE STATION DEVICE AND MOBILE COMMUNICATION SYSTEM

(75) Inventor: Tadashi Nakamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 227 days.

(21) Appl. No.: 12/965,079

(22) Filed: Dec. 10, 2010

(65) Prior Publication Data

US 2011/0075610 A1    Mar. 31, 2011

Related U.S. Application Data (63) Continuation of application No. PCT/JP2008/061850, filed on Jun. 30, 2008.

(51) Int. Cl.
*H04W 4/02* (2009.01)
(52) U.S. Cl.
USPC .......................................................... 370/328
(58) Field of Classification Search
USPC .............. 455/434, 456.1, 403; 370/337, 331, 370/208, 328, 320, 335
See application file for complete search history.

(56) References Cited

U.S. PATENT DOCUMENTS

| | | | |
|---|---|---|---|
| 5,794,146 A * | 8/1998 | Sevcik et al. | 455/434 |
| 6,532,223 B1 * | 3/2003 | Sakoda et al. | 370/337 |
| 7,027,427 B1 | 4/2006 | Tamura | |
| 7,548,762 B2 * | 6/2009 | Fabrega-Sanchez et al. | 455/556.1 |
| 2002/0041579 A1 * | 4/2002 | Tanno et al. | 370/335 |
| 2003/0002470 A1 | 1/2003 | Park et al. | |
| 2003/0040312 A1 * | 2/2003 | Tohono | 455/434 |
| 2003/0095516 A1 * | 5/2003 | Ok et al. | 370/331 |
| 2004/0023634 A1 * | 2/2004 | Jeong et al. | 455/403 |
| 2005/0025087 A1 * | 2/2005 | Tamura | 370/320 |
| 2006/0105780 A1 * | 5/2006 | Ueda et al. | 455/456.1 |
| 2007/0140106 A1 * | 6/2007 | Tsai et al. | 370/208 |
| 2007/0184836 A1 * | 8/2007 | He | 455/434 |
| 2009/0067370 A1 * | 3/2009 | Kim et al. | 370/328 |

FOREIGN PATENT DOCUMENTS

| | | |
|---|---|---|
| CN | 1402458 | 3/2003 |
| JP | 2000-287256 | 10/2000 |
| JP | 2001-086035 | 3/2001 |
| JP | 2001-285909 | 10/2001 |
| JP | 2002-94415 | 3/2002 |
| JP | 2003-348001 | 12/2003 |
| JP | 2007-110478 | 4/2007 |

(Continued)

OTHER PUBLICATIONS

International Search Report issued for corresponding International Patent Application No. PCT/JP2008/061850, mailed Jul. 29, 2008.

(Continued)

*Primary Examiner* — Asad Nawaz
*Assistant Examiner* — Parth Patel
(74) *Attorney, Agent, or Firm* — Myers Wolin, LLC (57) ABSTRACT

A mobile communication system is provided with a base station device and a mobile terminal, which mutually perform radio communication. The system is also provided with a cell search part provided in the mobile terminal conducting a cell search, and an operation part configured to calculate a period for another cell search based on a period required for the cell search. The cell search part conducts the another cell search during the period calculated by the operation part.

8 Claims, 11 Drawing Sheets

(56) References Cited

FOREIGN PATENT DOCUMENTS

| JP | 02007251304 A | * | 9/2007 | ............... H04B 7/26 |
| KR | 1019990030177 | | 4/1999 | |
| KR | 2007081380 A | * | 8/2007 | |

OTHER PUBLICATIONS

Notice of Preliminary Rejection Office Action issued by the Korean Intellectual Property Office for corresponding Korean Patent Application No. 10-2010-7029484 mailed Mar. 2, 2012 with English translation.

First Notification of Office Action issued for corresponding Chinese Patent Application No. 2008801300951, issued Jan. 30, 2013 with English translation.

Notification of Reason(s) for Refusal issued for corresponding Japanese Patent Application No. 2010-518838, dispatched Feb. 26, 2013 with an English translation.

* cited by examiner

MOBILE TERMINAL, BASE STATION DEVICE AND MOBILE COMMUNICATION SYSTEM

CROSS-REFERENCE TO RELATED APPLICATION

This application is a continuation application of PCT/JP2008/061850 filed Jun. 30, 2008, the contents of which are herein wholly incorporated by reference

FIELD

A certain aspect of the present invention is related to a mobile terminal, a base station device, and a mobile communication system.

BACKGROUND

Recently, a mobile communication system in which a mobile terminal such as a portable phone and a base station device communicate with each other with radio has been widely used. The base station has a cell, which is a range within which the base station may communicate with mobile terminals. In a case where the mobile terminal moves from the cell of the base station with which the mobile terminal is communicating to the cell of another base station, handover from the base station involved in the current communication to another base station is conducted. The mobile terminal periodically searches for cells in proximity to the cell to which the mobile terminal belongs (cell search). The mobile terminal communicates with the base station that has a cell having a good reception level on the basis of the results of the cell search.

There is known an art of changing the period of the cell search on the basis of determining whether the mobile terminal remains in the current cell (see Patent Document 1). There is known another art of shortening the period of the cell search in such a manner that the base station stores information about a spread signal and a phase corresponding to the base station beforehand (see Patent Document 2). There is known a further art of notifying the mobile terminal of results of past learning about failure of handoff by the base station and performing the cell search based on the results of the past learning (see Patent Document 3).

Patent Document 1: Japanese Laid-Open Patent Publication No. 2003-348001
Patent Document 2: Japanese Laid-Open Patent Publication No. 2001-285909
Patent Document 3: Japanese Laid-Open Patent Publication No. 2000-287256

SUMMARY

There is provided a mobile terminal communicating with a base station device, including a cell search part that conducts a cell search and a next cell search using an adjusted cell search period based on a period required for the cell search.

DESCRIPTION OF EMBODIMENTS

Figure 1:
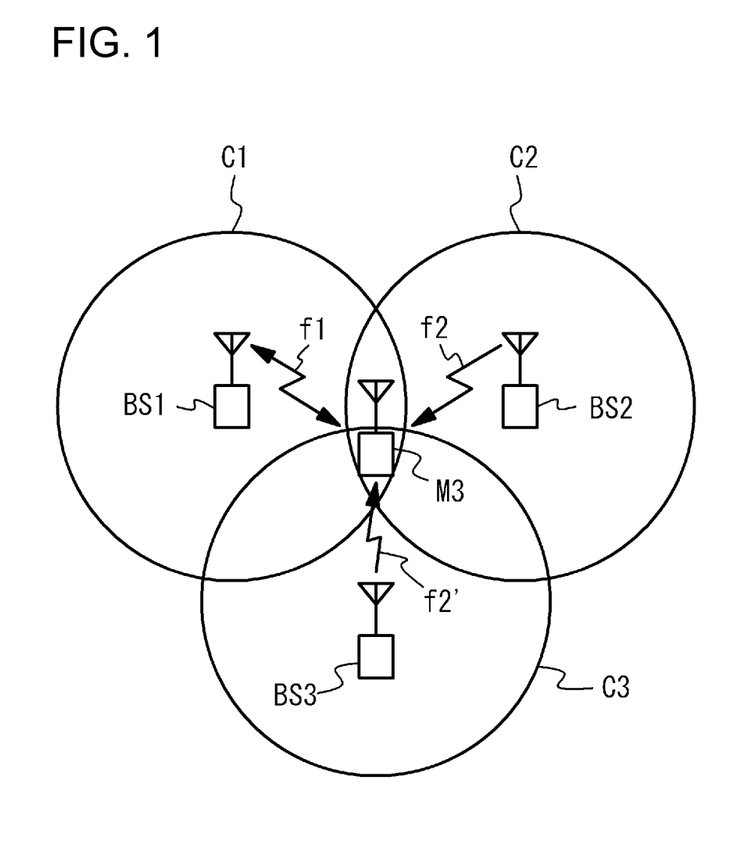
FIG. 1 is a diagram of a cell arrangement in a mobile communication system in accordance with a comparative example.
Figure 2:
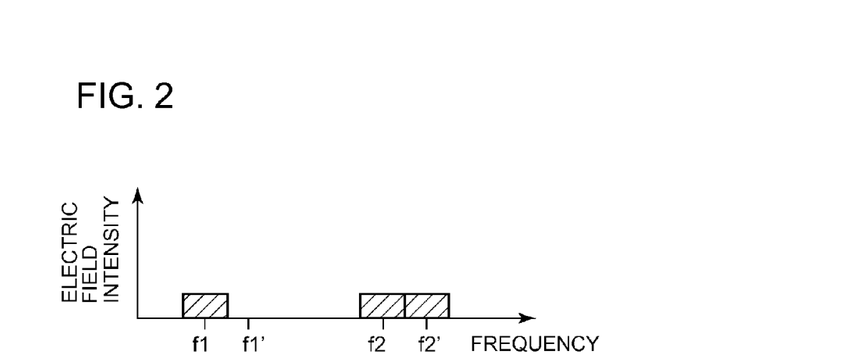
FIG. 2 is a diagram that illustrates an electric field intensity of the mobile communication system in accordance with the comparative example.

A detailed description will now be given of embodiments for carrying out the invention. FIG. 1 is a diagram of a cell arrangement in a mobile communication system in accordance with a comparative example. Referring to FIG. 1, a mobile terminal MS is located in cells C1, C2 and C3 corresponding to base stations BS1, BS2 and BS3, respectively. The base stations BS1, BS2 and BS3 transmit radio signals using frequencies f1, f2 and f2', respectively. FIG. 2 illustrates the electric field intensities for the frequencies in the situation illustrated in FIG. 1. The base stations BS1, BS2 and BS3 transmit signals used for measuring the qualities of radio communications with an almost identical transmission power. Since the distances between the mobile terminal MS and the base stations BS1, BS2 and BS3 are almost equal to each other, the electric field intensities at the frequencies f1, f2 and f2' are almost equal to each other. As in the case of FIG. 1, in the case where the base stations BS1, BS2 and BS3 employ the different frequencies for communicating with the mobile terminal MS, the mobile terminal MS stops communicating with the base station BS1 and changes the frequency from f1 to f2 and f2' for cell search.

Figure 3:
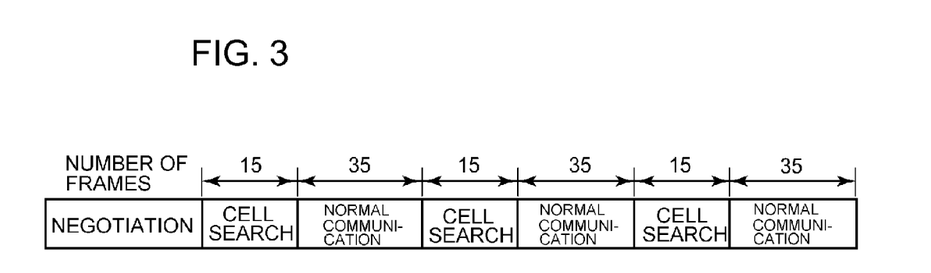
FIG. 3 is a diagram that illustrates an operation of the mobile communication system in accordance with the comparative example.

FIG. 3 is a diagram that depicts operations of the mobile terminal MS. The left-to-right direction indicates the passage of time. In the hereinafter, time is represented by the number of frames. That is, the period for cell search is represented by the number of frames in the cell search. The base station BS1, which is communicating with the mobile terminal MS, conducts negotiation with the mobile terminal MS, and notifies the mobile terminal MS of the cell search start timing and the cell search time (period). For example, in FIG. 3, the time (period) for cell search corresponds to 15 frames, and the time (period) for normal communication between the base station BS1 and the mobile terminal MS corresponds to 35 frames. The cell search is periodically conducted. Of course, times (periods) different from those described above may be employed.

In the cell search period, the mobile terminal MS receives signals transmitted by the base stations BS2 and BS3 that form the cells in proximity to the cell of the base station BS1 with which the mobile terminal MS is communicating, and searches for the cell that has the best receiving condition (for example, the highest electric field intensity). In the period of normal communication, the mobile terminal MS communicates with the base station BS1. In this communication, the mobile terminal MS reports the communication qualities of the base stations BS2 and BS3 to the base station BS1. As illustrated in FIG. 2, when the electric field intensities resulting from the base stations BS1 and BS2 are almost equal to each other, an almost equal number of frames for cell search may be required for the base stations BS2 and BS3. Thus, as illustrated in FIG. 3, it is enough to employ a constant number of frames for cell search by the mobile terminal MS.

Figure 4:
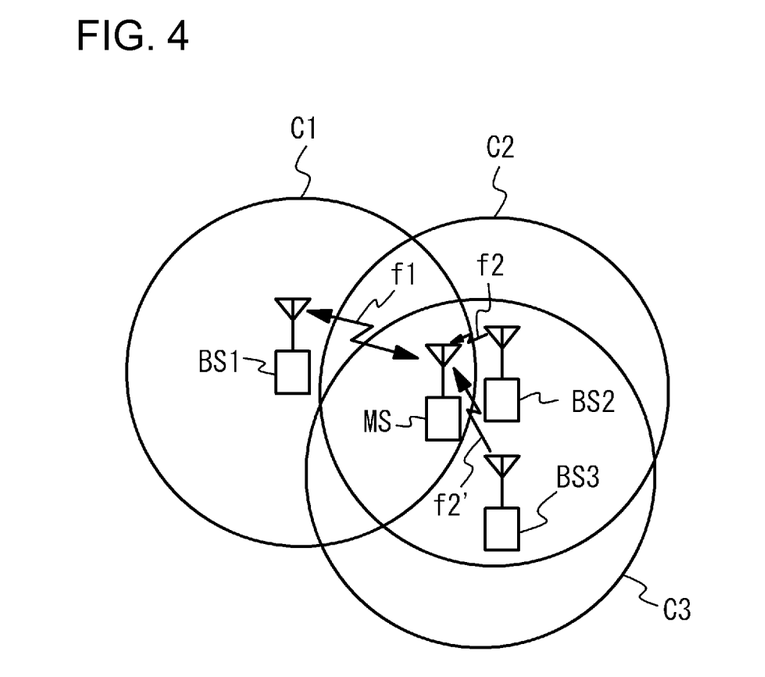
FIG. 4 is a diagram that illustrates a cell arrangement.
Figure 5:
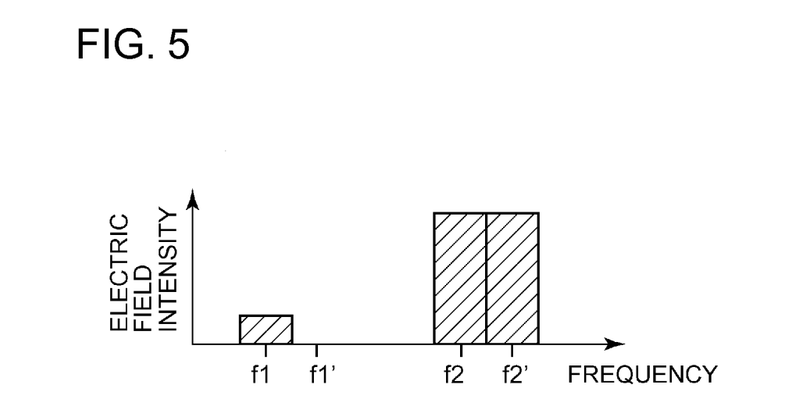
FIG. 5 is a diagram that illustrates an electric field.

FIG. 4 is a diagram of a cell arrangement. The base stations BS1, BS2 and BS3 have a large cell overlapping area. In a case where the base stations BS1, BS2 and BS3 are located close to each other, a situation as illustrated is likely to happen, provided that the radio area C2 (C3) of the base station BS2 (or BS3) is greater than the radio area C1 of the base station BS1. For example, there is a possibility that the operators of the base stations BS1 and BS2 (BS3) may be different from each other and employed values of transmission power may be different from each other. Thus, in a case where the mobile terminal MS is located at an end of the cell C1, the distance of the mobile terminal MS and the base station BS2 (BS3) is less than the distance between the mobile terminal MS and the base station BS1. FIG. 5 illustrates the electric fields related to the respective frequencies in the case of the cell arrangement in FIG. 4. The electric fields of the base stations BS2 and BS3 that respectively use the frequencies f2 and f2' for communications are greater than the electric field of the base station BS1 that is communicating with the mobile terminal MS at the frequency f1.

The number of frames required for cell search relates to the electric field from the base station. For instance, in a case where the electric field from the base station is weak, the time for pulling in synchronization and the time for averaging directed to improving the measurement accuracy may be lengthened. In the cell arrangement illustrated in FIGS. 4 and 5, the number of frames required for cell search may be smaller than that in the cell arrangement in FIGS. 1 and 2. However, as illustrated in FIG. 3, in the case where the number of frames for cell search is fixed, the number of frames for cell search is determined so as to be suitable for the bases station having a relatively small electric field. Thus, some frames may be excessive when the cell search is conducted for the base station having a relatively large electric field.

Now, a description will be given of embodiments of a mobile communication system capable of achieving reduction in the number of cells for cell search even for the cell arrangement illustrated in FIGS. 4 and 5.

Embodiment 1

Figure 6A:
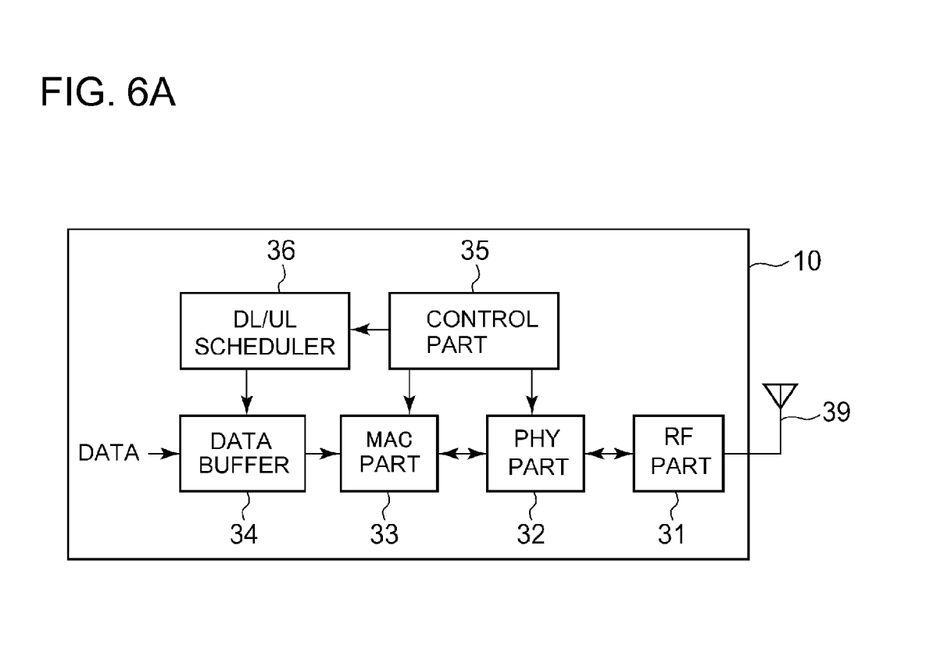
FIG. 6A is a block diagram of a base station terminal in accordance with an embodiment 1.
Figure 6B:
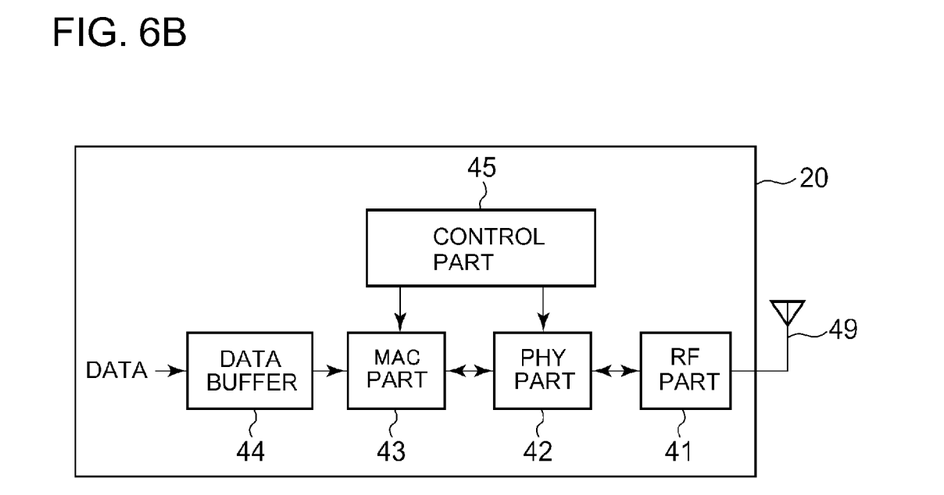
FIG. 6B is a block diagram of a mobile terminal.

FIG. 6A is a block diagram of a base station device in accordance with an embodiment 1, and FIG. 6B is a block diagram of a mobile terminal. A base station device 10 includes an antenna 39, an RF (Radio Frequency) part 31, a PHY (Physical) part 32, a MAC (Media Access Control) part 33, a data buffer 34, a control part 35 and a DL/UL (Down Link/Up Link) scheduler 36. Data to be sent to the mobile terminal is stored in the data buffer 34. The DL/UL scheduler 36 instructs the data buffer 34 to have timings for data transmission and reception. Data is output to the RF part 31 via the MAC part 33 that controls the MAC layer, and the PHY part 32 that controls the physical layer. The RF part 31 upconverts the base band signal to an RF wave to thus generate an RF signal. The RF signal is transmitted via the antenna 39. The control part 35 controls the MAC part 33 and the DL/UL scheduler 36 on the basis of information (search time control information) about the number of frames for cell search obtained from the mobile terminal, and instructs the number of frames for cell search (search period information) to the mobile terminal.

In FIG. 6B, a mobile terminal 20 includes an antenna 49, an RF part 41, a PHY part 42, a MAC part 43, a data buffer 44 and a control part 45. Data to be transmitted to the base station device 10 is stored in the data buffer 44. Operations of the MAC part 43, the PHY part 42 and the RF part 41 are the same as those of the MAC part 33, the PHY part 32 and the RF part 31, and a description thereof is omitted. The control part 45 controls the MAC part 43 and the PHY part 42 to conduct the cell search. The control part 45 measures the time required for cell search.

Figure 7:
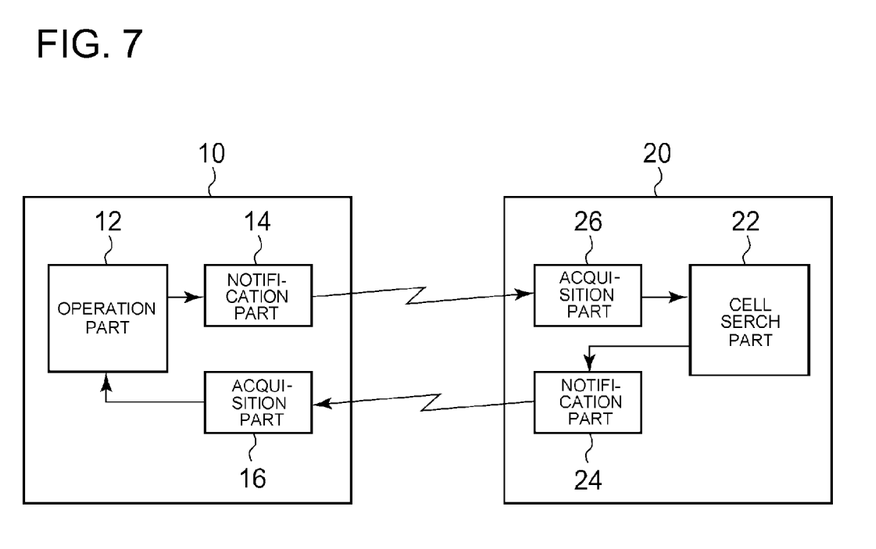
FIG. 7 is a functional block diagram of a mobile communication system in accordance with an embodiment 1.

FIG. 7 is a functional block diagram of a mobile communication system in accordance with the embodiment 1. The base station device 10 includes an operation part 12, a notification part 14, and an acquisition part 16. The control part 35 illustrated in FIG. 6A functions as the operation part 12. The operation part 12 operates (adjusts) the number of frames (search period) for conducting the next cell search on the basis of the number of frames (search period control information) that is actually required for cell search and is received from the mobile terminal 20. The search period control information may be information that indicates time determined so that the mobile terminal 20 actually switches the frequency for searching for adjacent cells, pulls a received signal in synchronization and measures the quality of reception. The RF part 31, the PHY part 32 and the MAC part 33 function as the notification part 14 when data is transmitted to the mobile terminal 20. The RF part 31, the PHY part 32 and the MAC part 33 function as the acquisition part 16 when data is received from the mobile terminal 20.

The mobile terminal 20 includes the cell search part 22 and the notification part 24. The control part 45 in FIG. 6B functions as the cell search part 22. The cell search part 22 receives the signal transmitted by the base station device 10 and periodically conducts the cell search. The RF part 41, the PHY part 42 and the MAC part 43 function as the notification part 24 when data is transmitted to the base station device 10. The RF part 41, the PHY part 42 and the MAC part 43 function as the acquisition part 26 when data is received from the base station device 10. For example, the radio of the portable phone may be used to transmit data from the notification part 14 of the base station device 10 to the acquisition part 26 of the mobile terminal 20. Similarly, data may be transmitted from the notification part 24 of the mobile terminal 20 to the acquisition part 21 of the base station device 10.

Figure 8:
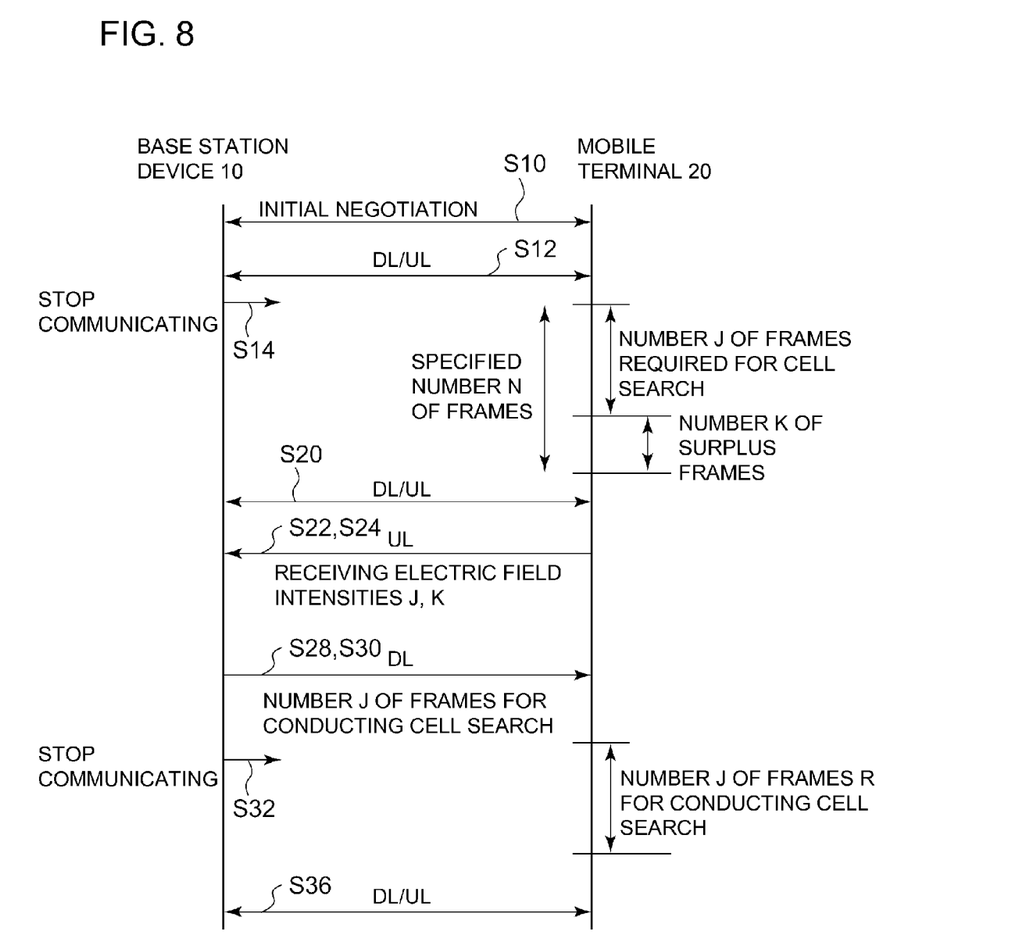
FIG. 8 is a diagram that describes an operation of the mobile communication system in accordance with the embodiment 1.
Figure 9:
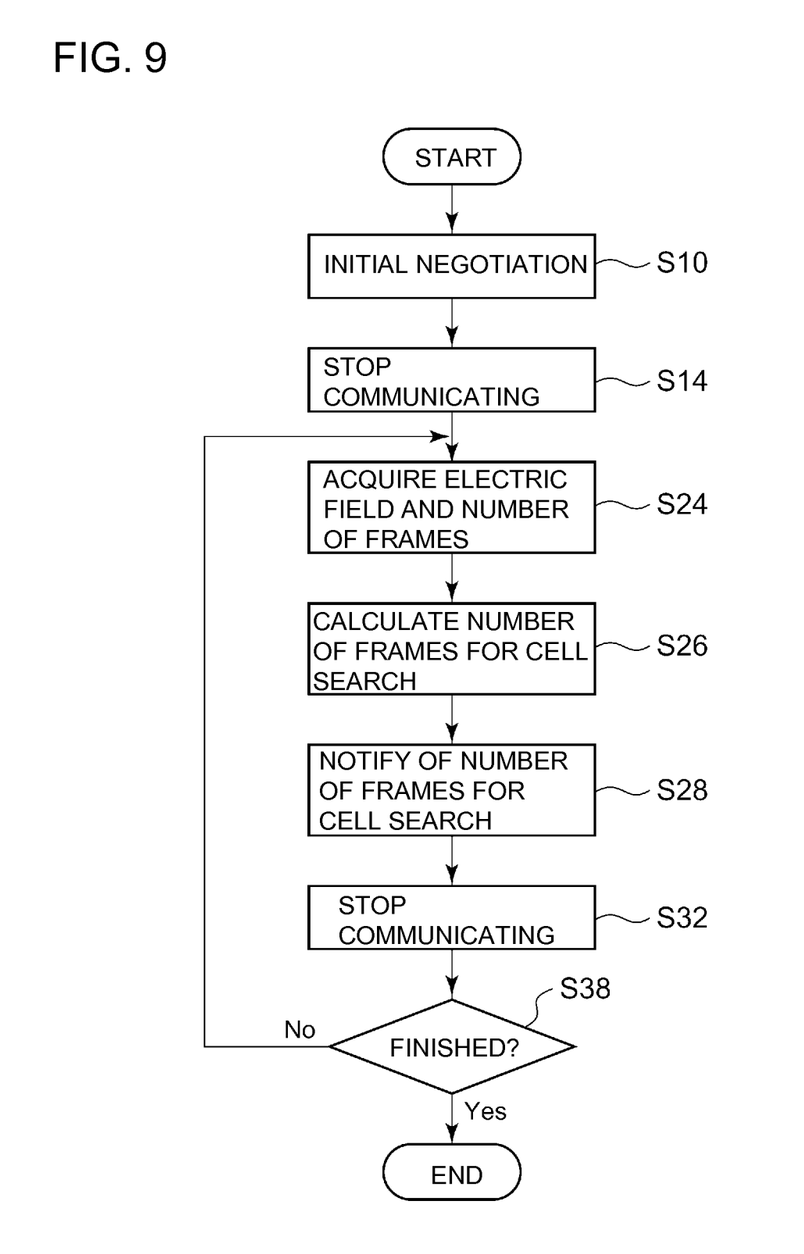
FIG. 9 is a flowchart that describes an operation of a control part of a base station device.
Figure 10:
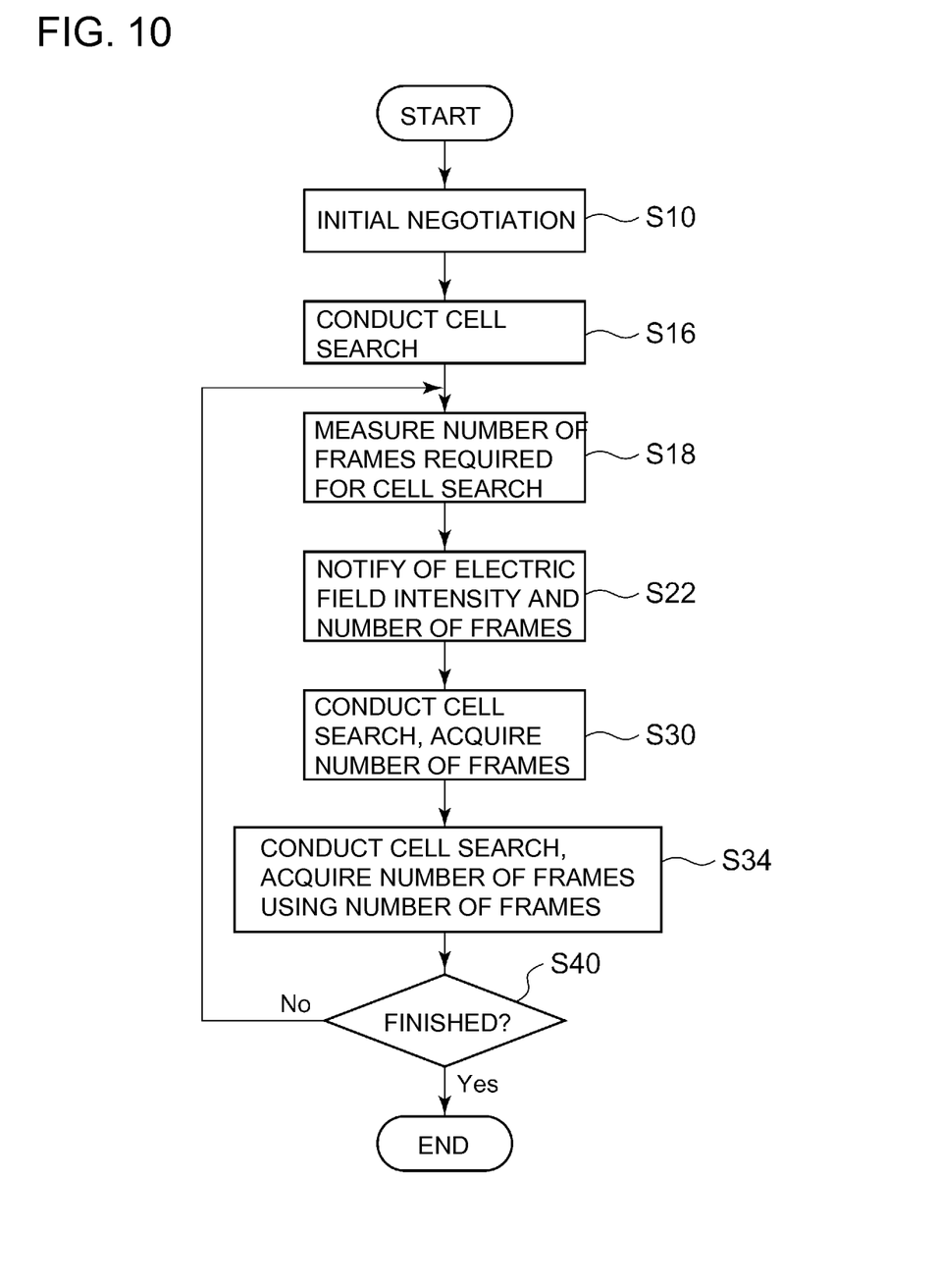
FIG. 10 is a flowchart that describes an operation of a mobile terminal.

FIG. 8 is a diagram that illustrates an operation of the mobile communication system in accordance with the embodiment 1. A down link DL indicates data transmission from the base station device 10 to the mobile terminal 20, and an up link UP indicates data transmission from the mobile terminal 20 the base station device 10. FIG. 9 is a flowchart of an operation of the mobile terminal. Referring to FIGS. 8 through 10, an initial negotiation is carried out between the base station device 10 and the mobile terminal 20 (step S10). In the initial negotiation, the control part 35 of the base station device 10 communicates with the control part 45 of the mobile terminal 20, determines the number N of frames (search period) specified for cell search, and notifies the control part 45 of the mobile terminal 20 of the number N of frames.

Data is transferred between the base station device 10 and the mobile terminal 20 (step S12). The control part 35 of the base station device 10 stops transmitting data to the mobile terminal 20, and the mobile terminal 20 stops receiving from the base station device 10 (step S14). The control part 45 of the mobile terminal 20 conducts the cell search (step S16). The control part 45 measures the number J of frames required for the cell search (search period information indicating the period actually required for the cell search) and the number K of surplus frames (step S18). The number K of frames is the remainder after the number K of frames among the specified number N of frames is required for the cell search.

When the specified search period is complete, the base station device 10 and the mobile terminal 20 communicate with each other again (step S20). The notification part 14 of the mobile terminal 20 notifies the base station device 10 of the receiving electric field intensity of the base station and search period information (the numbers J and K of frames) (step S22). The acquisition part 26 of the base station device 10 acquires the receiving electric field intensity and the search period information (the numbers J and K of frames) (step S24). The operation part 12 of the base station device 10 calculates (adjusts) the number of frames (search period) for conducting the next cell search from the search period information (the numbers J and K of frames) (step S26). In the embodiment 1, the number J of frames is used as the number of frames for conducting the next cell search.

The notification part 24 of the base station device 10 notifies the mobile terminal 20 of the number J of frames (search period) for the next cell search (step S28). The acquisition part 16 of the mobile terminal 20 acquires the number J of frames for the next cell search from the base station device 10 (step S30). The control part 35 of the base station device 10 stops transmitting data to the mobile terminal 20, which stops receiving from the base station device 10 (step S32). The cell search part 22 of the mobile terminal 20 conducts the cell search during the search period (the number J of frames) received from the base station device 10 (step S34). The control part 35 of the base station device 10 determines whether the cell search is finished (step S38). When the answer is YES, the process ends. When the answer is NO, the process returns to step S24. The control part 45 of the mobile terminal 20 determines whether the cell search is finished (step S40). When the answer is YES, the process ends. When the answer is NO, the process returns to step S18. When the cell search is not yet finished, communication continues as indicated by step S36 in FIG. 8. Although FIGS. 8 through 10 describe the case where the single base station device 10 is involved, the mobile terminal 20 may similarly communicate with multiple base station devices 10 that conduct the cell search. The control part 35 acquires the receiving electric field intensities of the radio waves from the base station devices, and conducts a handover to the base station device having the best receiving condition. The mobile terminal 20 may report the search period information measured for every search period to the base station device 10 and may reflect the reported search period information on the next search period every time. Of course, this report may be conducted only once.

Figure 11:
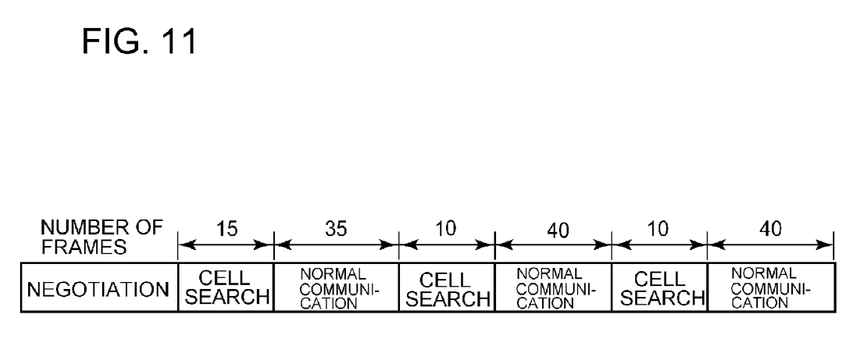
FIG. 11 is a diagram that describes a flow of the mobile communication system in accordance with the embodiment 1.

FIG. 11 is a diagram that illustrates an operation of the mobile communication system in accordance with the embodiment 1. As compared to FIG. 3, the number of frames as of the second-time cell search is 10, and the number of frames between the base station BS1 and the mobile terminal MS is 40. The others are the same as those in FIG. 3 and a description thereof is omitted.

According to the embodiment 1, as in the case of step S26, the operation part 12 uses the number J of frames required for the cell search as the number J of frames for the next cell search. As in the case of step S34, the cell search part 22 conducts the next cell search by using the number J of frames for the next cell search. Frequently, the receiving electric field intensity in the next cell search may be approximately equal to that in the previous cell search. Thus, it may be considered that the number of frames for conducting the next cell search may be nearly equal to that required for the previous cell search. Thus, as in the case of the embodiment 1, the number of frames for the next cell search is set equal to the number of frames actually required for the previous cell search, so that the number K of surplus frames in FIG. 8 may be reduced. For example, as compared between FIG. 3 and FIG. 11, the communication throughput may be improved by 14%.

In the next cell search, if the number of frames required for the cell search exceeds the number J of frames and is equal to a number J' of frames, the cell search may overlap the normal communication frames. In this case, the operation part 12 sets the number J' of frames for the next cell search. As described above, the cell search may be conducted stably dependent on the arrangement of the base stations 10 and the positions of the mobile terminals 20.

Embodiment 2

Figure 12:
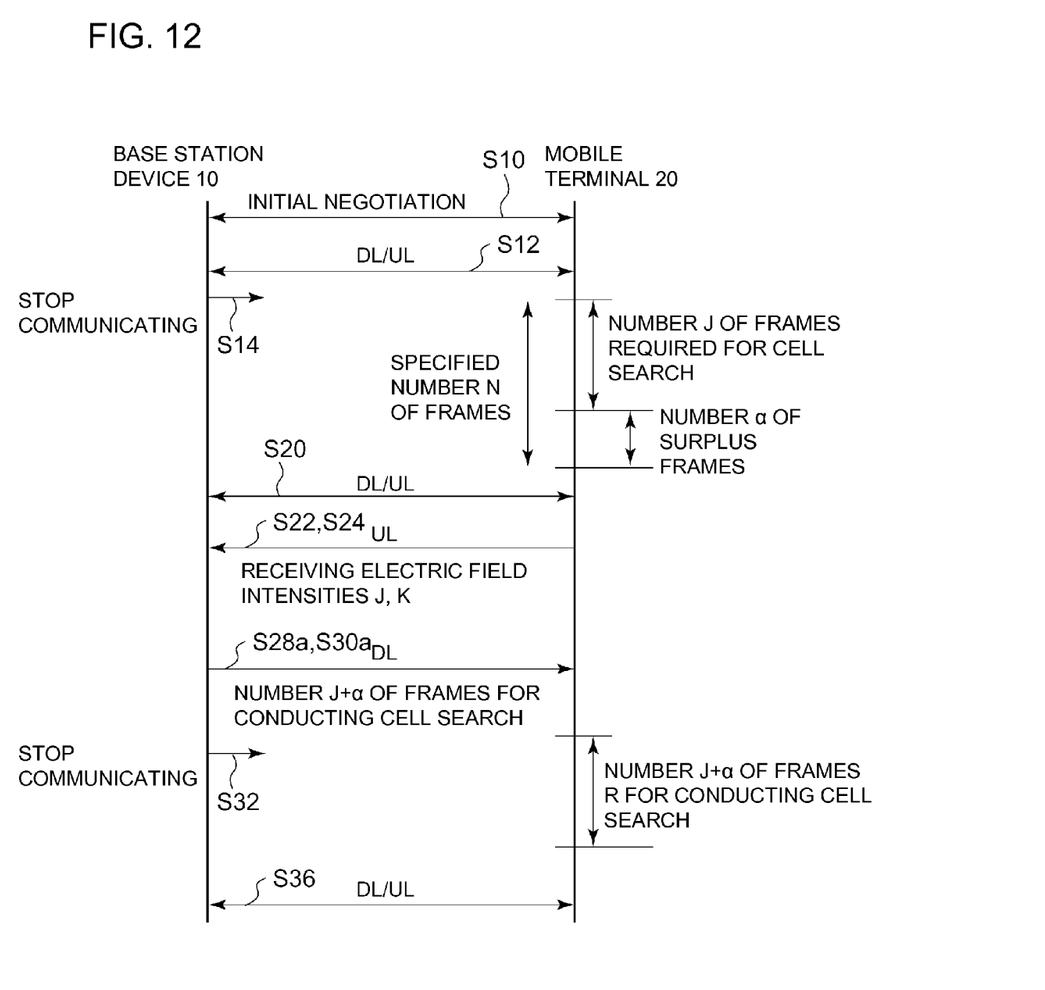
FIG. 12 is a sequence diagram of a mobile communication system in accordance with an embodiment 2.

An embodiment 2 is an example in which the number of frames for the cell search by the operation part 12 is set greater than the number of frames required for the cell search. FIG. 12 is a sequence diagram of a mobile communication system in accordance with the embodiment 2. First, the operation part 12 of the base station device 10 sets the number of frames for cell search equal to the sum of the number J of frames and the number a of margin frames. In FIG. 12, the notification part 14 of the base station device 10 notifies the acquisition part 26 of the mobile terminal 20 of the number J+α of frames for the cell search (steps S28a, 30a). At step S34 in FIG. 10, the cell search part 22 conducts the cell search with the number J+α of frames for the cell search. Other operations are the same as those of the embodiment 1, and a description thereof is omitted.

There is a case where the receiving electric field intensity that is available when the next cell search is conducted is weaker than the receiving electric field intensity that is obtained when the previous cell was conducted. In this case, the number of frames required for the next cell search is greater than that required for the previous cell search. According to the embodiment 2, the number of frames for the cell search is set greater than the number of frames required for the previous cell search. Thus, even if the number of frames required for the next cell search is greater than that required for the previous cell search, it is possible to restrain the cell search from overlapping frames used for normal communications. The margin a may be a constant number of frames or a variable number of frames.

Embodiment 3

Figure 13:
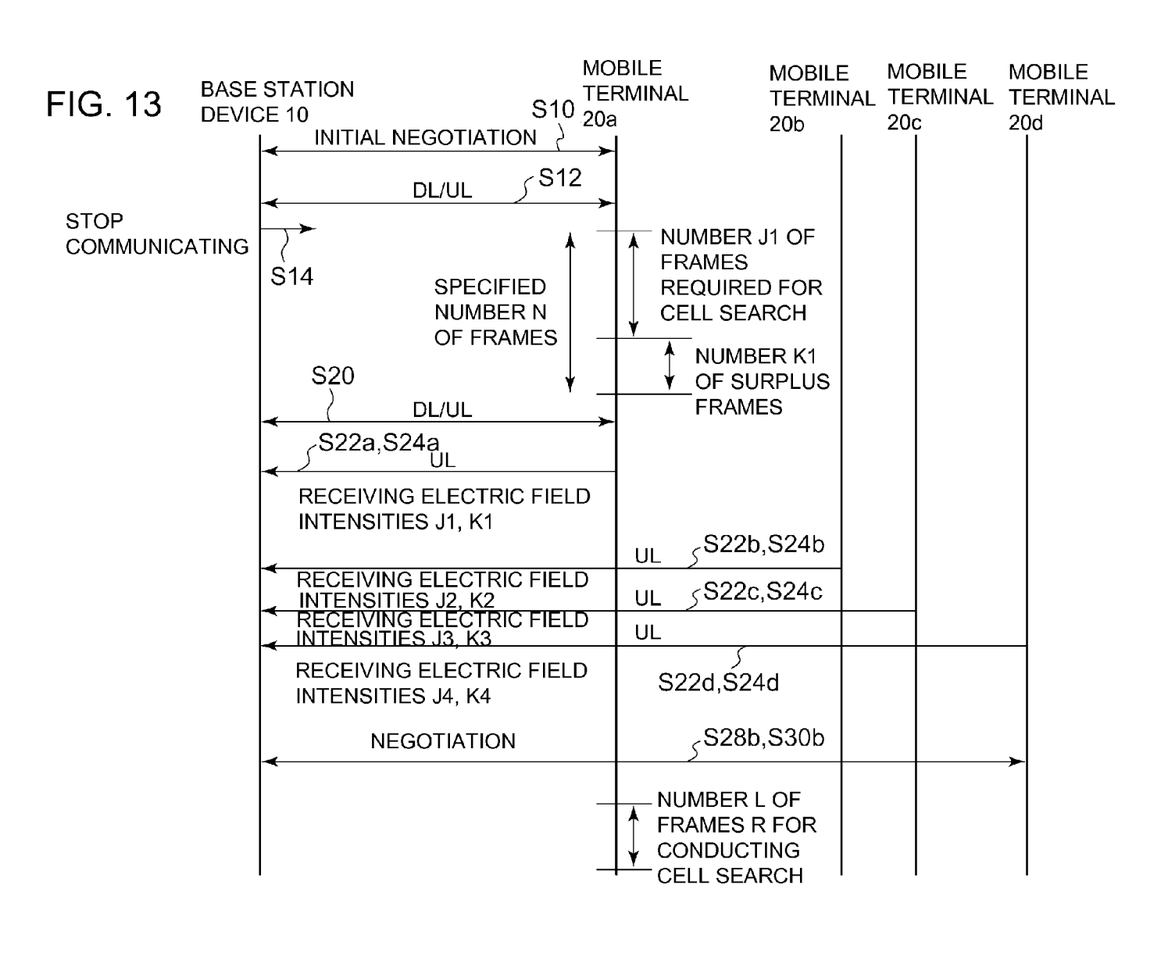
FIG. 13 is a sequence diagram of a mobile communication system in accordance with an embodiment 3.

An embodiment 3 is an example in which the operation part calculates the period for the next cell search on the basis of the number of frames required for a cell search for multiple mobile terminals. FIG. 13 is a sequence diagram of a mobile communication system in accordance with the embodiment 3. Referring to FIG. 13, the base station device 10 is communicating with multiple mobile terminals 30a through 20d. The acquisition part 16 of the base station device 10 acquires, from the notification parts of the multiple mobile terminals 20a through 20d, the respective receiving electric field intensities, the numbers J1-J4 of frames required for the cell search, and the numbers K1-K4 of surplus frames (steps S22a through S22d, and S24a through 24d). At step S26, the operation part 12 calculates the number L of frames required in the next cell search on the basis of the numbers J1-J4 of frames required for the cell search for the multiple mobile terminals 20a through 20d.

The mobile terminals 20a through 20d are notified of the number L of frames required in the next cell search by negotiation between the base station device 10 and the multiple mobile terminals 20a through 20d (steps S28b, S30b). The cell search parts 22 of the mobile terminals 20a through 20d conduct the cell search with the number L of frames. Other operations are the same as those of the embodiments 1 and 2, and a description thereof is omitted.

A method for calculating the number L of frames for the next cell search by the operation part 12 may simply average the numbers J1-J4 of frames and add the margin a to the average number of frames. The number of frames thus produced is required in the next cell search. The maximum number of frames among the numbers J1-J4 of frames may be used as the number L of frames with which the next cell search is conducted. As described above, the number L of frames for the next cell search may be calculated based on statistical information about the numbers J1-J4 of frames and the numbers K1-K4 of frames.

According to the embodiment 3, the number L of frames used for the next cell search may be appropriately determined even when the base station device 10 is communicating with the multiple mobile terminals 20a through 20d.

As in the case of the embodiments 1 through 3, the number of frames (adjusted cell search period) for the next cell search is adjusted by the operation part on the basis of the number of frames (search period) actually required in the cell search by the operation part 12, so that the cell search period may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A mobile terminal communicating with a base station device, the mobile terminal comprising:
    a cell search part that conducts a cell search within a determined cell search period that is determined by the base station device, measures a period of the cell search as a measured cell search period, and conducts a next cell search within an adjusted cell search period set longer than or equal to the measured cell search period and shorter than the determined cell search period by base station device when the measured cell search period is shorter than the determined cell search period;
    a notification part configured to notify the base station device of information about the measured cell search period; and
    an acquisition part configured to acquire information about the adjusted cell search period from the base station, wherein;
    the determined cell search period is a number of frames specified for the cell search;
    the measured cell search period is a number of frames required for the cell search; and
    the adjusted cell search period is a number of frames for conducting the next cell search.

2. The mobile terminal according to claim 1, further comprising:
    a notification part configured to notify the base station device of information about the measured cell search period; and
    an acquisition part configured to acquire information about the adjusted cell search period from the base station.

3. The mobile terminal according to claim 1, wherein the adjusted cell search period is equal to the measured cell search period.

4. The mobile terminal according to claim 1, wherein the adjusted cell search period is longer than the measured cell search period.

5. A base station device communicating with a mobile terminal, base station device comprising:
    a control part configured to determine a determined cell search period;
    an acquisition part configured to acquire, from the mobile terminal, information about a measured cell search period measured by the mobile terminal when the mobile terminal conducts a cell search within the determined cell search period;
    an operation part configured to set an adjusted cell search period longer than or equal to the measured cell search period and shorter than the determined cell search period when the measured cell search period is shorter than the determined cell search period; and
    a notification part configured to notify the mobile terminal of information about the adjusted cell search period, the mobile terminal conducting a next cell search within the adjusted cell search period, wherein;
    the determined cell search period is a number of frames specified for the cell search;
    the measured cell search period is a number of frames required for the cell search; and
    the adjusted cell search period is a number of frames for conducting the next cell search.

6. The base station device according to claim 5, further comprising an operation part configured to set the adjusted cell search period equal to the measured cell search period.

7. The base station device according to claim 5, further comprising an operation part configured to set the adjusted cell search period longer than the measured cell search period.

8. A mobile communication system including a base station device and a mobile terminal that mutually perform radio communication, comprising:
    a cell search part that is provided in the mobile terminal and conducts a cell search within a determined cell search period that is determined by base station device, measures a period of the cell search as a measured cell search period, and conducts a next cell search using an adjusted cell search period set longer than or equal to the measured cell search period and shorter than the determined cell search period by base station device when the measured cell search period is shorter than the determined cell search period;
    an operation part that is provided in the base station and is configured to set an adjusted cell search period longer than or equal to the measured cell search period and shorter than the determined cell search period when the measured cell search period is shorter than the determined cell search period; and a notification part that is provided in the base station and is configured to notify the mobile terminal of information about the adjusted cell search period, the mobile terminal conducting a next cell search within the adjusted cell search period, wherein;

the determined cell search period is a number of frames specified for the cell search;

the measured cell search period is a number of frames required for the cell search; and the adjusted cell search period is a number of frames for conducting the next cell search.

* * * * *